United States Patent
Soh et al.

(10) Patent No.: US 11,226,502 B1
(45) Date of Patent: Jan. 18, 2022

(54) PHOTONIC INTEGRATED CIRCUITS FOR GENERATING HIGH-BRIGHTNESS SQUEEZED LIGHT

(71) Applicant: National Technology & Engineering Solutions of Sandia, LLC, Albuquerque, NM (US)

(72) Inventors: Daniel Beom Soo Soh, Pleasanton, CA (US); Matt Eichenfield, Albuquerque, NM (US); Christopher Michael Long, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/081,233

(22) Filed: Oct. 27, 2020

(51) Int. Cl.
| | |
|---|---|
| *G02F 1/01* | (2006.01) |
| *G02F 1/21* | (2006.01) |
| *G02F 1/225* | (2006.01) |
| *G02B 6/12* | (2006.01) |
| *G02B 6/122* | (2006.01) |
| *G02B 6/30* | (2006.01) |
| *G02B 26/00* | (2006.01) |

(52) U.S. Cl.
CPC .............. *G02F 1/0134* (2013.01); *G02B 6/12* (2013.01); *G02B 6/12004* (2013.01); *G02F 1/0128* (2013.01); *G02F 1/0131* (2013.01); *G02F 1/212* (2021.01); *G02F 1/225* (2013.01); *G02F 1/2257* (2013.01); *G02B 6/1225* (2013.01); *G02B 6/305* (2013.01); *G02B 26/001* (2013.01); *G02B 2006/1213* (2013.01)

(58) Field of Classification Search
None
See application file for complete search history.

(56) References Cited

U.S. PATENT DOCUMENTS

| | | | |
|---|---|---|---|
| 7,457,548 B2 | 11/2008 | Tomaru | |
| 7,539,422 B2 | 5/2009 | Tomaru | |
| 8,213,751 B1 | 7/2012 | Ho et al. | |
| 8,831,056 B2 | 9/2014 | Savchenkov et al. | |
| 8,849,075 B2 | 9/2014 | Painter et al. | |

(Continued)

OTHER PUBLICATIONS

Purdy et al. "Strong Optomechanical Squeezing of Light", PHYS. Rev. X 3, 031012 (2013), Published by the American Physical Society. (Year: 2013).*

(Continued)

*Primary Examiner* — Michelle R Connelly
(74) *Attorney, Agent, or Firm* — Medley, Behrens & Lewis, LLC

(57) ABSTRACT

A high-brightness squeezed light source includes a plurality of light squeezing elements and a photonic summing device. The light squeezing elements each output respective squeezed light responsive to receipt of unsqueezed light. The photonic summing device receives the squeezed light output by each of the light squeezing elements and coherently adds the squeezed light to generate a high-brightness squeezed light output. The high-brightness squeezed light output has a greater brightness than the outputs of the light squeezing elements, and a same degree of squeezing as one or more of the outputs of the light squeezing elements.

20 Claims, 8 Drawing Sheets

(56) References Cited

U.S. PATENT DOCUMENTS

| | | | |
|---|---|---|---|
| 11,073,412 B2* | 7/2021 | Taurel | G01D 5/268 |
| 2020/0057350 A1* | 2/2020 | Amin | G02F 1/025 |

OTHER PUBLICATIONS

Lee et al. "Squeezed-light-driven force detection with an optomechanical cavity in a Mach-Zehnder interferometer", Scientific Reports, (2020) 10:17496, www.nature.com/scientificreports. (Year: 2020).*

Pezze et al. "Mach-Zehnder Interferometry at the Heisenberg Limit with Coherent and Squeezed-Vacuum Light", Physical Review Letters, PRL 100, 073601 (2008), The American Physical Society. (Year: 2008).*

Safavi-Naeini et al., "Squeezed light from a silicon micromechanical resonator", Nature, Aug. 8, 2013, vol. 500, 185. (Year: 2013).*

B. J. Lawrie, P. D. Lett, A. M. Marino, and R. C. Pooser, "Quantum Sensing with Squeezed Light", ACS Photonics 2019 6 (6), 1307-1318, DOI: 10.1021/acsphotonics.9b00250 (Year: 2019).*

Ulrik L Andersen et al "30 years of squeezed light generation" 2016 Phys. Scr. 91 053001 (Year: 2016).*

* cited by examiner

US 11,226,502 B1

PHOTONIC INTEGRATED CIRCUITS FOR GENERATING HIGH-BRIGHTNESS SQUEEZED LIGHT

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Squeezed light finds application in various measurement and other optical devices. In general, squeezed light refers to light for which measurement noise is non-uniformly distributed between non-commuting quadratures (e.g., amplitude and phase quadratures). Therefore, as compared to non-squeezed light, squeezed light exhibits less measurement noise on one of the two non-commuting quadratures and greater noise on the other quadrature. Thus, squeezed light allows one of amplitude or phase to be measured more precisely than for non-squeezed light, while sacrificing resolution in the other quadrature.

Conventionally, squeezed light has been generated using parametric oscillators that rely on nonlinear optical effects caused by the use of various nonlinear optical materials. However, such materials are not suitable for some applications, such as chip-scale devices. Further, squeezed light has conventionally been generated near vacuum with low power.

SUMMARY

The following is a brief summary of subject matter that is described in greater detail herein. This summary is not intended to be limiting as to the scope of the claims.

Various technologies relating to generating of high-brightness squeezed light are described herein. With greater specificity, technologies pertaining to a photonic integrated circuit (PIC) for generating high-brightness squeezed light are described herein. In an exemplary embodiment, a system for generating high-brightness squeezed light comprises a first light squeezing device and a second light squeezing device. In various embodiments, the light squeezing devices can be optomechanical resonators that are configured to exhibit both optical and mechanical resonance in response to input of an optical driver signal. An optomechanical resonators can be configured such that the mechanical and optical resonances are coupled. With greater specificity, mechanical oscillation of an optomechanical resonator changes a resonant frequency of the electric field within the optomechanical resonator. A mechanical oscillation of the optomechanical resonator is squeezed when the optomechanical resonator is pumped by two detuned optical waves. By virtue of the coupling of the mechanical and optical resonances in the optomechanical resonator, an optical output of the optomechanical resonator is also squeezed. Thus, while the optical input to the optomechanical resonator may be unsqueezed, the optical output of the optomechanical resonator is squeezed.

The system further comprises a photonic summing device that is configured to coherently add light received from multiple sources. The photonic summing device receives first squeezed light from the first light squeezing device (e.g., a first optomechanical resonator) and second squeezed light from the second light squeezing device (e.g., a second optomechanical resonator). The photonic summing device is configured to output third squeezed light that has a power, or brightness, that is approximately equal to the sum of the powers of the first squeezed light and the second squeezed light. The third squeezed light maintains a degree of squeezing that is approximately equal to a degree of squeezing shared by the first squeezed light and the second squeezed light. The degree of squeezing refers to how low one of two non-commuting quadratures of the light go below the standard shot noise. Accordingly, the system allows brightness of squeezed light to be increased while preserving its degree of squeezing.

The system described above is further suitable for inclusion on a PIC. By way of example, and not limitation, the optomechanical resonators can be formed on a substrate from chip-compatible materials such as silicon, gallium arsenide, silicon nitride, or the like. Continuing the example, the photonic summing device can be formed from chip-compatible devices such as waveguides and Mach-Zehnder modulators (MZMs). Thus, technologies described herein are suitable for chip-scale integrated devices that can be easily and cost-effectively manufactured, and that are durable and reliable. Technologies described herein are therefore suitable for inclusion in devices for quantum computing, quantum metrology, squeezed light lidar, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
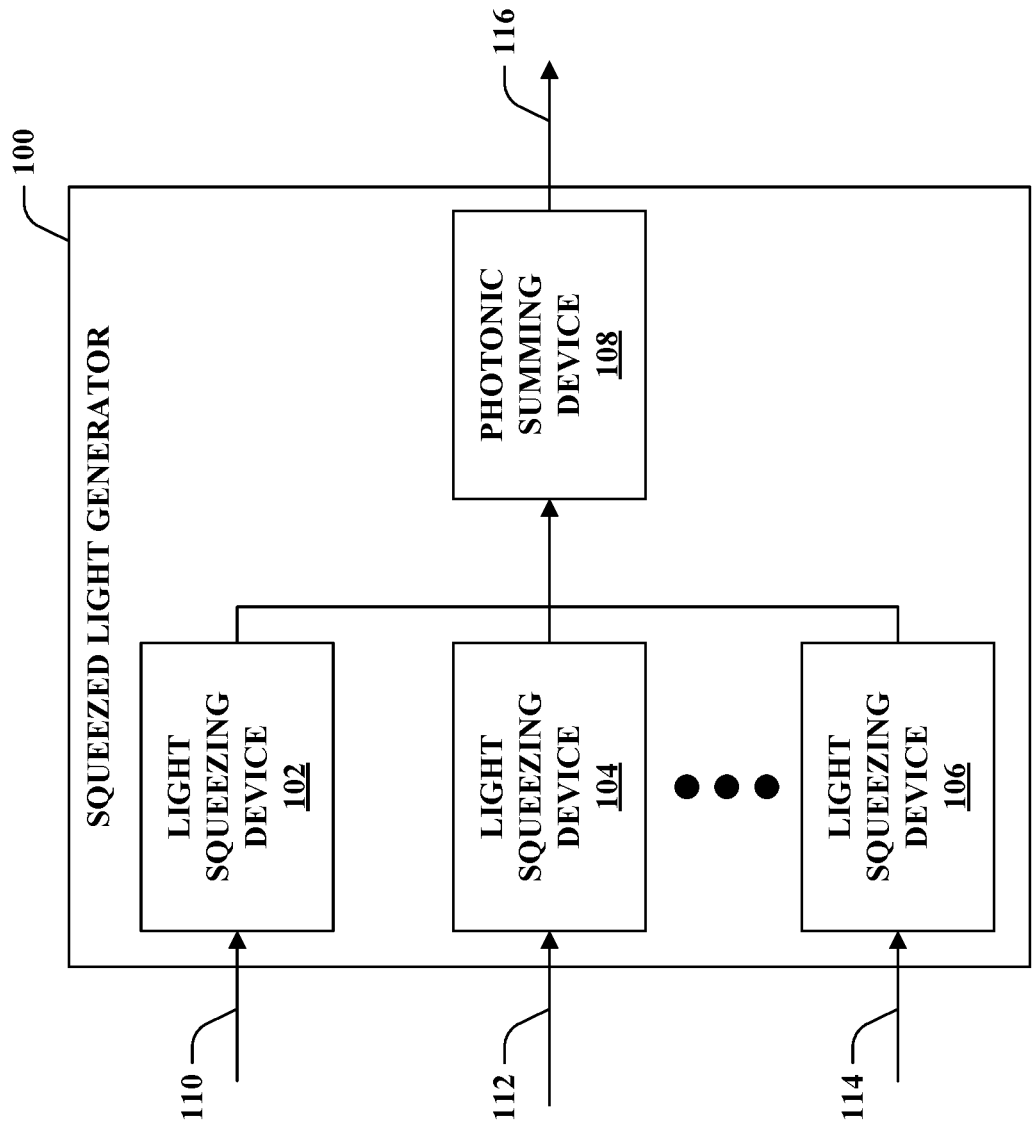
FIG. 1 is a functional block diagram of an exemplary squeezed light generator.

Various technologies pertaining to generating high-brightness squeezed light are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary squeezed light generator 100 is illustrated. The squeezed light generator 100 includes a plurality of N light squeezing devices 102-106, where N is an integer greater than 1. The squeezed light generator 100 further comprises a photonic summing device 108 that is configured to coherently combine light that is received as input at the photonic summing device 108. Each of the light squeezing devices 102-106 receives non-squeezed light as input by way of a respective input port 110-114. In some embodiments, each of the light squeezing devices 102-106 receives an optical signal from a respective laser (not shown). In other embodiments, each of the light squeezing devices 102-106 can receive light from a beam splitter, or array of beam splitters, that is configured to split a single optical signal into multiple optical signals, wherein outputs of the beam splitter or array of beam splitters are connected to the input ports 110-114 of the light squeezing devices 102-106.

The light squeezing devices 102-106 are configured to output squeezed light responsive to receipt of unsqueezed light at their respective input ports 110-114. The light squeezing devices 102-106 can be any of various devices that are configured to receive unsqueezed light and to output squeezed light. In a non-limiting example, and as will be described in greater detail below, a light squeezing device in the devices 102-106 can be or include an optomechanical resonator. In other exemplary embodiments, the light squeezing devices 102-106 can be optical parametric oscillators.

The light squeezing devices 102-106 output squeezed light to the photonic summing device 108. The photonic summing device 108 is configured to coherently add the squeezed light received from the light squeezing devices 102-106. Thus, the photonic summing device 108 receives low-power squeezed light at its input, and outputs higher-power squeezed light at its output. If losses in the generator 100 are neglected, the output of the photonic summing device 108 can have an output power that is approximately equal to a sum of the output powers of the light squeezing devices 102-106. A measure of squeezing of light can be defined by a degree of squeezing. The degree of squeezing can be defined as a measure of how much lower the quantum noise is on one of two non-commuting quadratures (e.g., amplitude or phase of light) than the standard shot noise of that quadrature. By virtue of coherent addition of the squeezed light output by the light squeezing devices 102-106, a degree of squeezing of the output of the photonic summing device 108 can be substantially the same as a degree of squeezing of the outputs of the light squeezing devices 102-106. By way of example, and not limitation, the degree of squeezing of the output of the photonic summing device 108 can be within 10% of the degree of squeezing of the outputs of the light squeezing devices 102-106, within 5% of the degree of squeezing of the outputs of the light squeezing devices 102-106, or within 1% of the degree of squeezing of the outputs of the light squeezing devices 102-106.

The photonic summing device 108 can include substantially any number of input ports. By way of example, and not limitation, the photonic summing device 108 can have a plurality of N input ports, such that the photonic summing device 108 has a corresponding input port for each of the light squeezing devices 102-106. The photonic summing device 108 can include various optical componentry that is configured to collectively perform coherent summing of squeezed light. By way of example, and not limitation, the photonic summing device 108 can include a plurality of waveguides coupled by beam splitters that are collectively configured to coherently add the light output by the light squeezing devices 102-106. In some exemplary embodiments, and as will be described in greater detail below, the photonic summing device 108 can be or include a nanophotonic processor, a photonic array, such as an array of MZMs, or the like.

Figure 2:
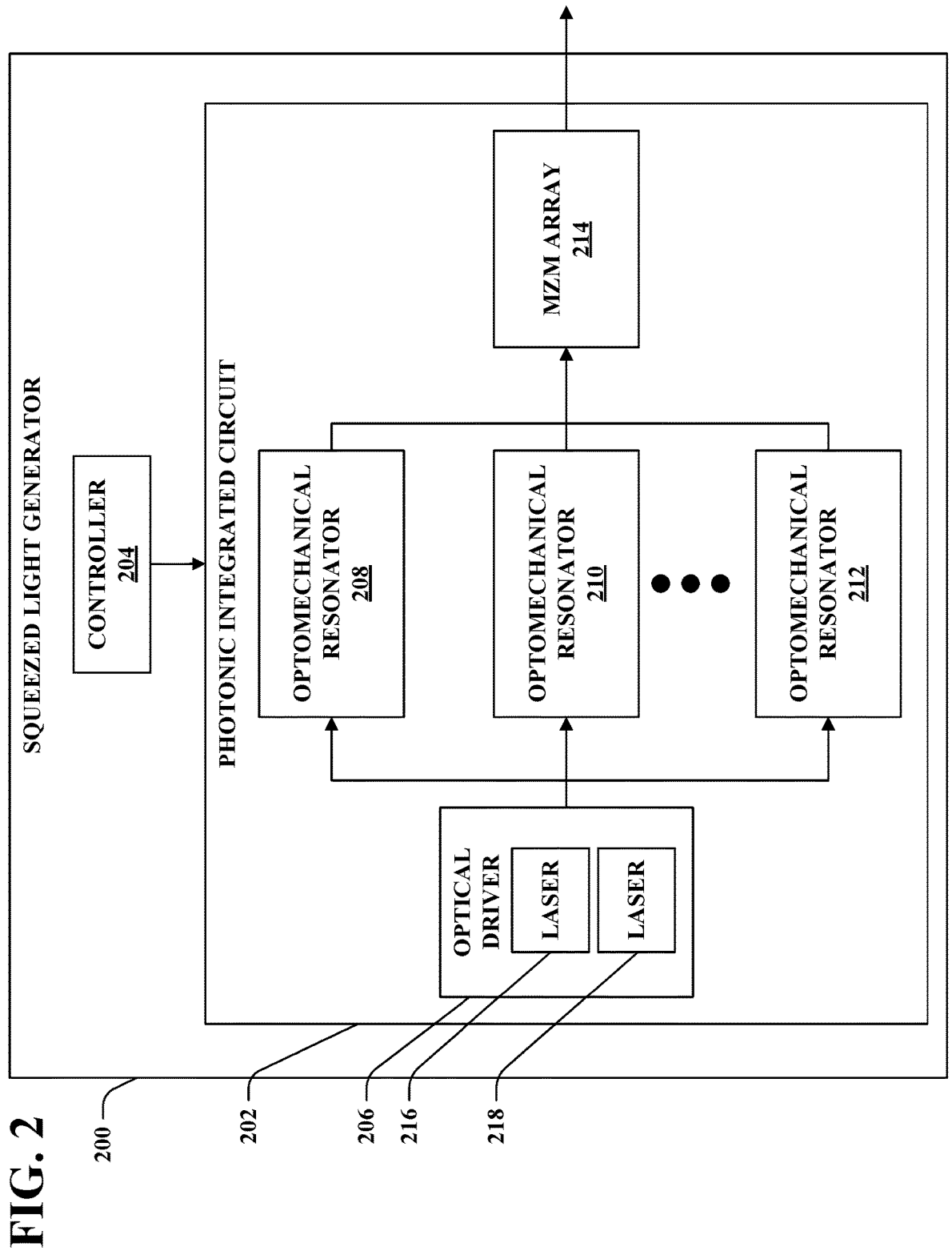
FIG. 2 is a functional block diagram of an exemplary PIC for generating squeezed light.

Referring now to FIG. 2, an exemplary chip-scale squeezed light generator 200 is illustrated, wherein the squeezed light generator 200 is suited for manufacture as an integrated, chip-scale device. As will be appreciated by those of skill in the art, optical components of the squeezed light generator 200 can be included as components of a PIC 202, such that the squeezed light generator 200 can be embodied as a single, integrated electro-optical device. The squeezed light generator 200 comprises the PIC 202 and an electrical controller 204. The controller 204 can be or include a hardware logic component that is configured to perform functionality for control of operations of the PIC 202, as will be described in greater detail below.

The PIC 202 comprises an optical driver 206, a plurality of optomechanical resonators 208-212, and an array of MZMs 214. Briefly, the optical driver 206 is configured to generate unsqueezed light that is output to the optomechanical resonators 208-212. The optomechanical resonators 208-212 receive the unsqueezed light and output squeezed light to the MZM array 214. The MZM array 214 receives the squeezed light from the optomechanical resonators 208-212 and coherently adds the squeezed light to yield squeezed light of higher brightness than the light received from the resonators 208-212. The MZM array 214 outputs the coherently added squeezed light as the output of the squeezed light generator 200.

The optical driver 206 provides an optical stimulus to drive the PIC 202. The optical driver 206 can include a first laser 216 and a second laser 218. Each of the lasers 216, 218 can be configured to output an optical signal having a different frequency. The frequencies of the lasers 216, 218 can be selected based upon a resonant frequency of the optomechanical resonators 208-212. The resonant frequency of the optomechanical resonators 208-212 is determined based upon physical dimensions and construction parameters of the resonators 208-212. In exemplary embodiments, the resonators 208-212 are constructed such that the resonators 208-212 all have substantially the same resonant frequency. The lasers 216, 218 can be selected or constructed such that the frequencies of their outputs are evenly spaced about the common resonant frequency of the resonators 208-212. State differently, the frequency of one of the lasers 216, 218 can be equal to the sum of the resonant frequency of the optomechanical resonators 208-212 and an offset frequency, while the frequency of the other of the lasers 216, 218 can be equal to the difference of the resonant frequency of the resonators 208-212 and the same offset frequency. By way of further explanation, the frequency of the first laser 216 can be written as:

$$\omega_1 = \omega_r + \omega_o$$

and the frequency of the second laser 218 can be written as:

$$\omega_2 = \omega_r - \omega_o$$

where $\omega_r$ is the resonant frequency of the resonators 208-212 and $\omega_o$ is an offset frequency.

The outputs of the lasers 216, 218 can be combined into a single output of the optical driver 206 (e.g., by way of a beam splitter, not shown). Thus, the output of the optical driver 206 can be a beam of two different frequencies. The single output of the optical driver 206 can then be split (e.g., by way of another beam splitter, not shown) evenly among the resonators 208-212.

The PIC 202 can include a plurality of N optomechanical resonators 208-212. The optomechanical resonators 208-212 are each configured to receive (unsqueezed) light from the optical driver 206, and to output squeezed light. The optomechanical resonators 208-212 are configured to output squeezed light based upon a coupling of mechanical and optical resonance in their respective optical cavities. The optomechanical resonators 208-212 exhibit mechanical vibrations responsive to receipt of light output by the optical driver 206. The mechanical vibrations have a frequency matching a mechanical resonant frequency of the optomechanical resonators 208-212. The mechanical vibrations of the optomechanical resonators 208-212 that are stimulated by input of two-tone light from the optical driver 206 are themselves squeezed. The mechanical vibrations within a cavity of one of the optomechanical resonators 208-212 cause the optical resonant frequency of the cavity to change. Thus, stimulated mechanical vibrations in the optomechanical resonators 208-212 affect the propagation of light within the optomechanical resonators 208-212. Stated differently, phonons and photons in the optomechanical resonators 208-212 are coupled.

The coupling of mechanical and optical resonances in the optomechanical resonators 208-212 facilitates squeezing of light by the optomechanical resonators 208-212. The squeezed mechanical vibrations within the optomechanical resonators 208-212 that are stimulated by the light received from the optical driver 206 cause light output from the optomechanical resonators 208-212 to be squeezed. The optomechanical resonators 208-212 are therefore able to produce squeezed light without reliance on nonlinear optical effects deriving from the emission of light through nonlinear optical materials.

Figure 3A:
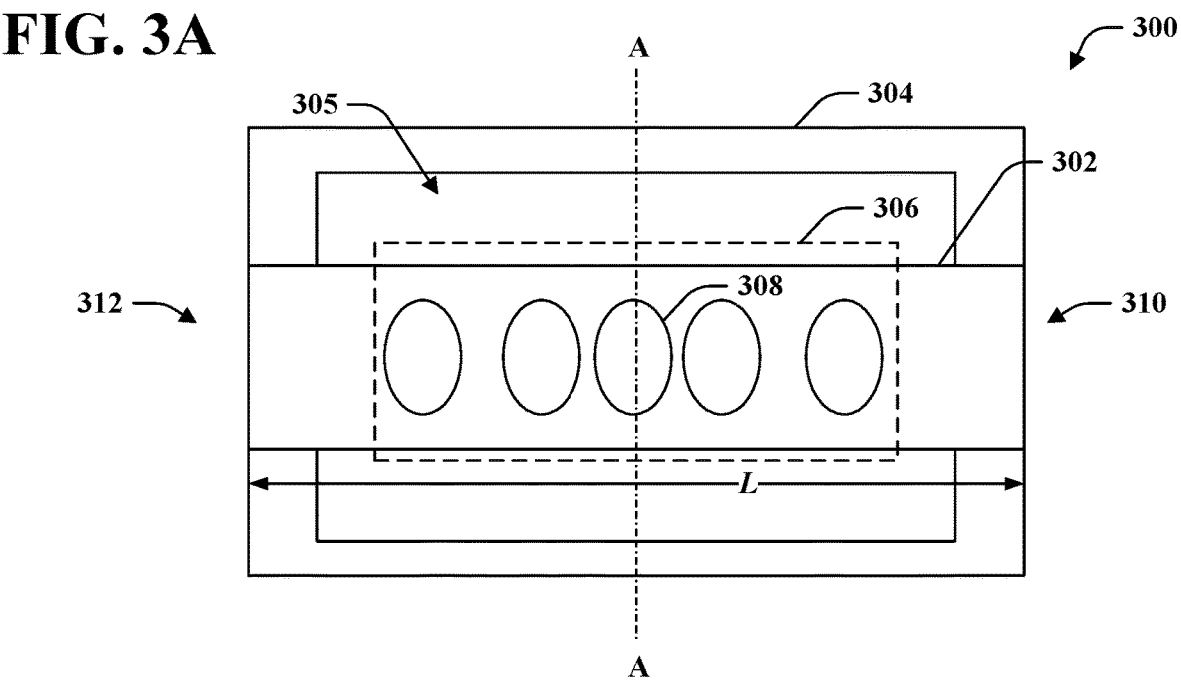
FIG. 3A is a top-down view of an exemplary optomechanical resonator.
Figure 3B:
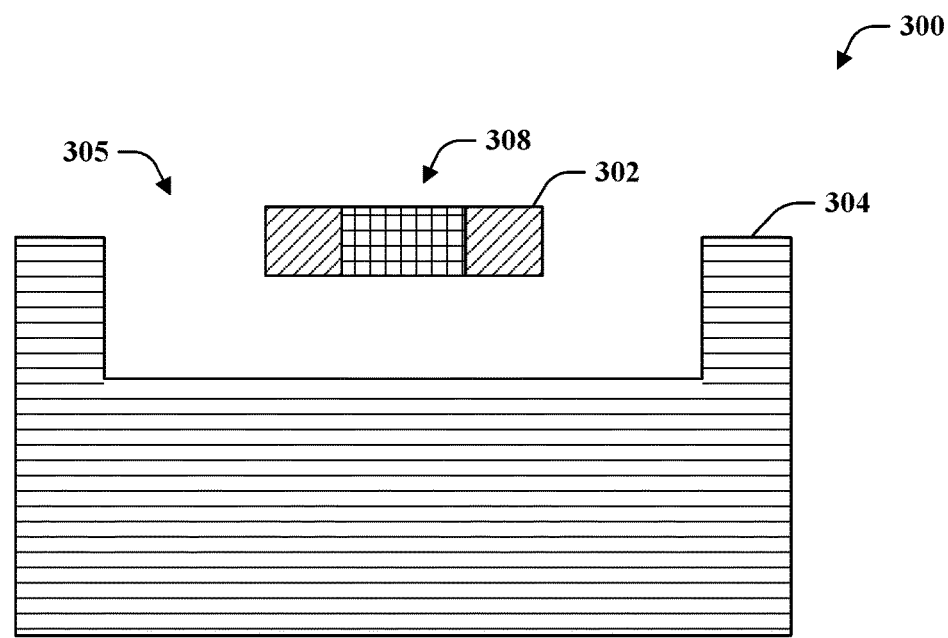
FIG. 3B is cross-sectional view of the exemplary optomechanical resonator of FIG. 3A.

The optomechanical resonators 208-212 can be fabricated at chip scale using scalable semiconductor manufacturing techniques. By way of example, and referring now to FIGS. 3A and 3B, an exemplary optomechanical resonator 300 is shown, wherein the resonator 300 is suitable for manufacture as part of a PIC. FIG. 3A depicts a top-down view of the resonator 300, whereas FIG. 3B depicts a cross-sectional view of the resonator 300 taken along line A-A shown in FIG. 3A. The resonator 300 comprises a resonator portion 302 and a support portion 304 that supports the resonator portion 302. The resonator portion 302 is configured to permit the propagation of light within the resonator portion 302. The support portion 304 is configured to provide mechanical support to the resonator portion 302 and to serve as a substrate on which the resonator portion 302 can be formed.

The resonator portion 302 is formed as a span over a depression or trough 305 that is formed in the support portion 304. The resonator portion 302 has a length L along which light propagates in the resonator portion 302. The resonator portion 302 has a resonating region 306 that includes a plurality of apertures (e.g., an aperture 308) spread along the length L of the resonator portion 302. A number of the apertures, sizes of the apertures, aperture spacing, and arrangement of the apertures affect both mechanical and optical performance of the resonator 300, as will be understood by those of skill in the art. The resonator portion 302 is kept suspended over the trough 305 by the support portion 304, whereas suspension over the trough 305 leaves the resonator portion 302 free to vibrate within at least the resonating region 306.

The resonator portion 302 can be formed from a semiconductor film that is substantially transparent (e.g., that transmits greater than 99% of received light to its output) to wavelengths of light that are desirably input to the resonator 300. In non-limiting examples, the semiconductor film can be composed of silicon, silicon nitride, or gallium arsenide. In order to form the resonator portion 302, the semiconductor film can be deposited on a substrate, and the substrate selectively etched or patterned in order to form the support portion 304 about the resonator portion 302. For example, the trough 305 can be etched into the substrate to form the support portion 304 subsequent to forming the resonator portion 302. The resonator portion 302 remains supported by the support portion 304 at each of two ends 310, 312 of the span of the resonator portion 302.

In order to facilitate coherent addition of the squeezed outputs of the optomechanical resonators 208-212, the optical or mechanical oscillations within the resonators 208-212 can be weakly coupled to facilitate their synchronization in frequency and phase. In general, coherent addition of two optical signals requires that their frequencies be substantially equal and that the phase difference between the two optical signals be substantially constant. The signals can then be coherently added by suitable phase-shifting of the optical signals to cause constructive interference between the two signals. The mechanical or optical oscillations in the optomechanical resonators 208-212 can be weakly coupled in order to ensure that the frequencies and phases of the optical outputs of the resonators 208-212 are substantially the same.

The optomechanical resonators 208-212 can be coupled either optically or mechanically. In an exemplary embodiment, the optomechanical resonators 208-212 can be optically coupled by way of coupling of the evanescent optical fields generated by propagation of light within the optomechanical resonators 208-212. Such evanescent coupling can be achieved by positioning the optomechanical resonators 208-212 in sufficiently close proximity that the evanescent field generated in one optomechanical resonator by virtue of propagation of light through the resonator overlaps with another optomechanical resonator. The evanescent coupling distance will depend on properties of the optomechanical resonators 208-212 and properties of the light propagating within them.

Figure 4:
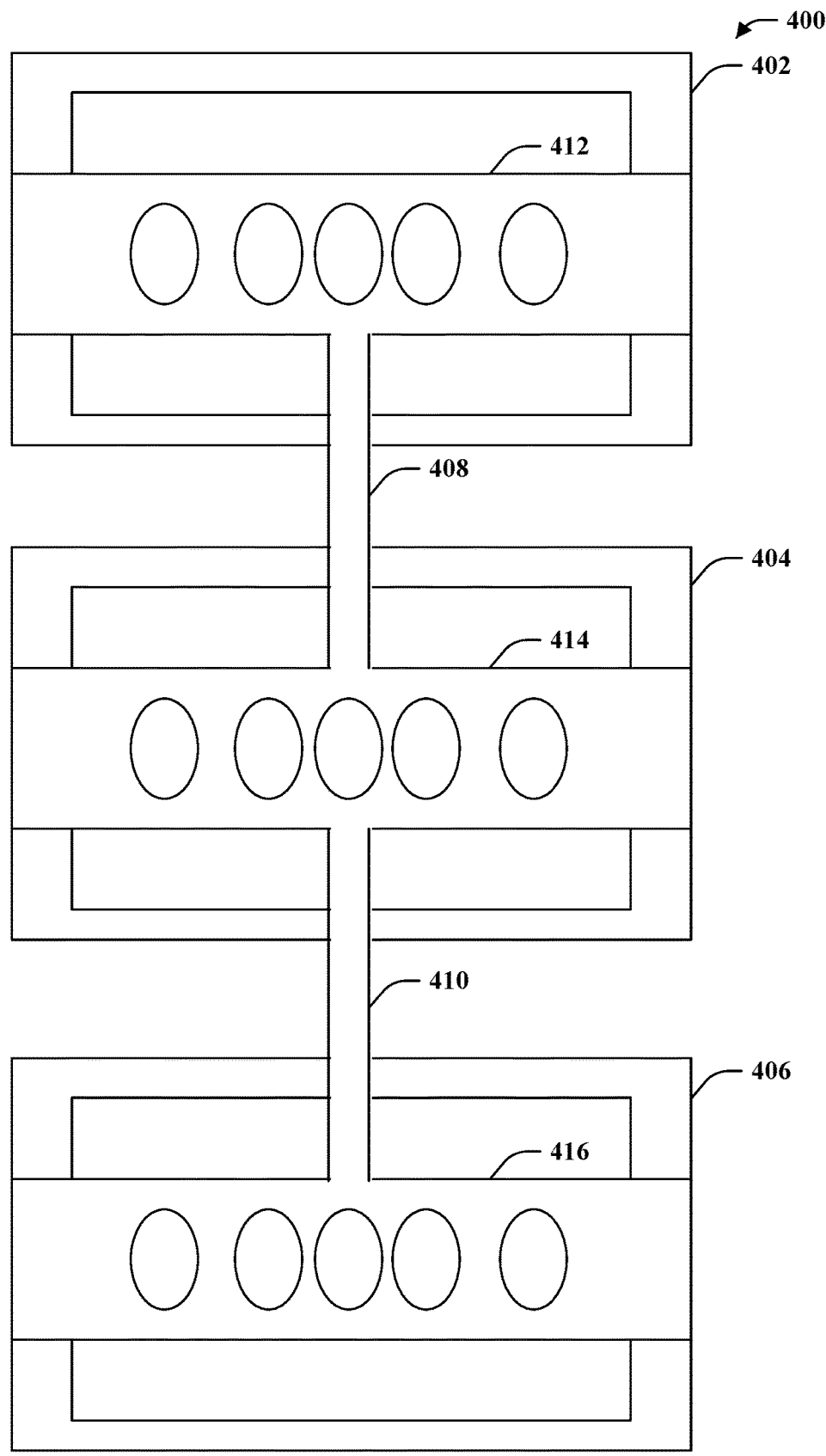
FIG. 4 is a top-down view of an exemplary array of mechanically coupled optomechanical resonators.

In another exemplary embodiment, the optomechanical resonators 208-212 can be mechanically coupled. In a non-limiting example, the optomechanical resonators 208-212 can be formed on a common substrate such that mechanical vibrations in one of the optomechanical resonators 208-212 are transmitted by way of the common substrate to another of the resonators 208-212. By way of another example, the optomechanical resonators 208-212 can be joined by coupling members that are configured to transmit an acoustic wave between resonators. Referring now to FIG. 4, an exemplary array 400 of optomechanical resonators 402-406 is shown, wherein each of the resonators 402-406 is connected to at least one other resonator in the resonators 402-406 by way of a coupling member. For example, the resonator 402 can be connected to the resonator 404 by a first coupling member 408, whereas the resonator 404 can be connected to the resonator 406 by a second coupling member 410. In order to facilitate transmission of an acoustic wave from one resonator to another, the coupling members 408, 410 can be connected solely to resonating portions 412-416 of the resonators 402-406, respectively.

Referring once again to FIG. 2, the MZM array 214 receives squeezed light from the optomechanical resonators 208-212. The MZM array 214 can be configured to have a same or greater number of input ports as there are resonators in the resonators 208-212. As noted above, the MZM array 214 is configured to coherently add the squeezed light output by the optomechanical resonators 208-212 to generate a single optical output signal. The MZM array 214 is configured such that the optical output of the MZM array 214 has an output power substantially the same as a sum of the output powers of the outputs of the resonators 208-212, and a degree of squeezing approximately equal to a degree of squeezing of the outputs of the resonators 208-212.

Figure 5:
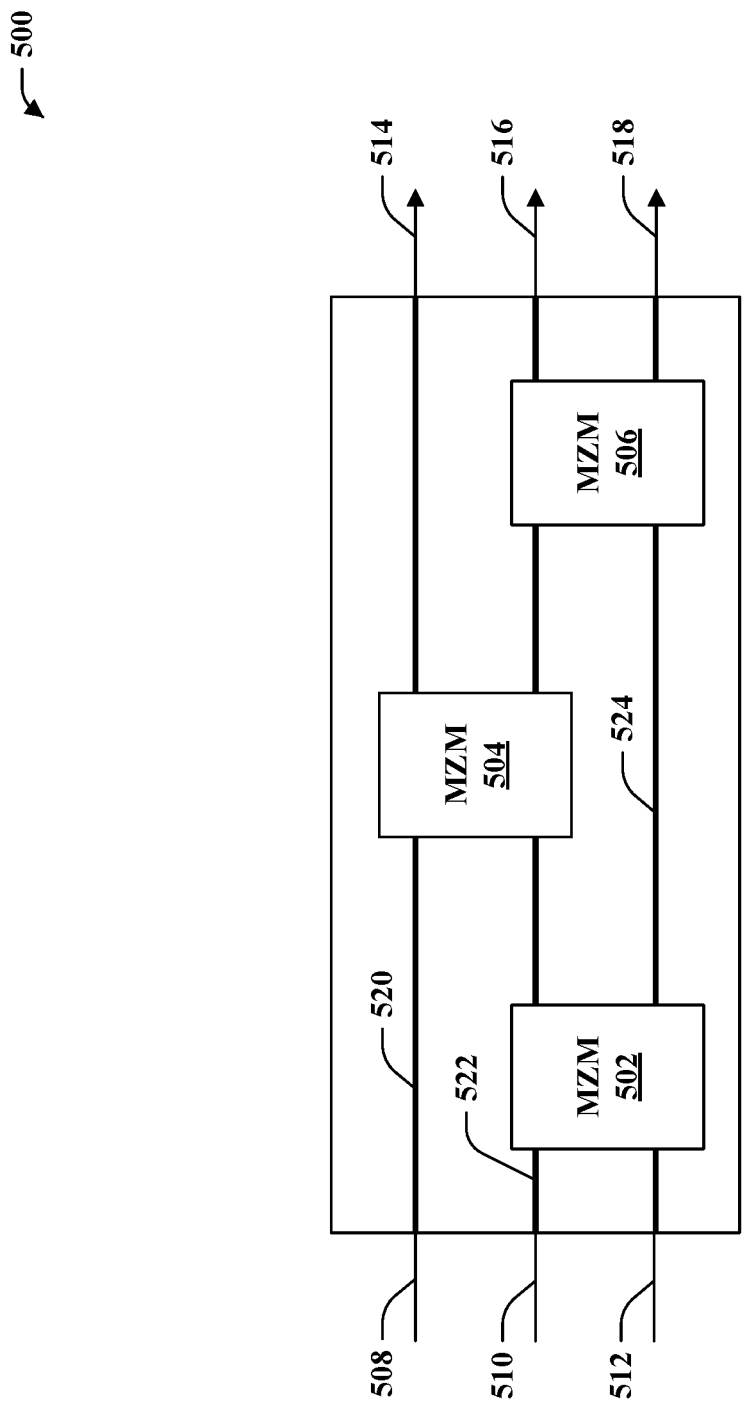
FIG. 5 is a conceptual diagram illustrating an exemplary MZM array for coherent summing of squeezed light.

The MZM array 214 coherently adds the inputs to the MZM array 214 based upon controllable phase shifting within the MZMs that make up the array 214, wherein such phase shifting promotes constructive or destructive interference of light within the array 214. By way of example, and referring now to FIG. 5, an exemplary MZM array 500 is shown. The array 500 comprises a plurality of three MZMs 502-506. The array 500 is a 3×3 array. In other words, the array 500 is controllable to map a plurality of three inputs 508-512 of the array 500 to a plurality of three outputs 514-518 of the array 500. The inputs 508-512 can be coupled, for example, to the outputs of the optomechanical resonators 208-212, respectively. Each of the inputs 508-512 is coupled to a respective waveguide in a plurality of waveguides 520-524.

Operations of the array 500 in connection with coherently summing light received at the inputs 508-512 are now described. Each of the MZMs 502-506 of the array 500 is configured as a two-input, two-output device. Within an MZM, each of the inputs is coupled to an "arm" of the MZM that extends through the MZM. In exemplary embodiments, an arm of an MZM is a waveguide that extends from one input to one output. Accordingly, the two-input, two-output MZM has two arms. For example, the waveguides 520, 522 can form the two arms of the MZM 504. Similarly, the waveguides 522, 524 can form the two arms of each of the MZMs 502, 506.

Each of the MZMs 502-506 is controllable such that a phase shift between its arms can be selected by appropriate control signals. Within the MZMs 502-506, light received at one input is evanescently coupled to light received at the other input, and vice versa. By controlling a relative phase shift between the arms of an MZM, the light received at the inputs of the MZM can be split between the outputs of the MZM, diverted entirely to one output of the MZM, or diverted entirely to the other output of the MZM. Accordingly, the MZM can receive two input signals and output a single signal (on either of its output arms) that is the sum of the two input signals.

In order to coherently sum the three inputs 508-512 to the array 500, the MZM 502 can be controlled such that its output power is concentrated in the middle waveguide 522. Thus, the total input power at the inputs 510-512 can be added and output by way of the middle waveguide 522 to the MZM 504. The MZM 504 receives the sum of the inputs 510, 512 from the middle waveguide 522 and receives the input 508 from the top waveguide 520. A phase shift between the arms of the MZM 504 can then be controlled such that the output power of the MZM 504 is concentrated on the top waveguide 522 connected to the top output port 514 of the array 500. An optical signal output by way of the top output port 514 is therefore the coherent sum of the optical signals received at the input ports 508-512. The remaining outputs 516, 518 then pass substantially no optical signal from the inputs 508-512 (i.e., the outputs 516, 518 are dark).

It will be understood that for a given array of MZMs, there may be a variety of ways that the MZMs in the array can be controlled to perform coherent summing of input signals to the array. For example, and referring once again to FIG. 2, the MZM array 214 can be configured as a programmable nanophotonic processor. A programmable nanophotonic processor, as used herein, refers to a device that is programmable to realize any arbitrary linear mapping between M optical inputs and M outputs. Stated differently, the programmable nanophotonic processor is configured such that, by suitable programming, any of M optical inputs or a sum of any subset or all of the M optical inputs can be output by way of any of the M optical outputs. The nanophotonic processor can be embodied by an array of MZMs (e.g., the MZM array 214) that are collectively controlled to perform a programmed mapping of the M inputs to the M outputs based upon phase shifting between arms of each MZM, in similar fashion to the MZM array 500 of FIG. 5. Thus, it is to be understood that the MZM array 214 can be configured to coherently add light from substantially any number of the optomechanical resonators 208-212. Further, as will be appreciated by those of skill in the art, the MZM array 214 can be configured to map its inputs or sums of its inputs to substantially any of a plurality of output ports. Accordingly, while various embodiments described herein contemplate that the coherent sum of all of the light input to the MZM array 214 will be output by the array 214 at a single output (e.g., from a single waveguide), coherent sums of different subsets of the input light can instead be output at different outputs of the MZM array 214. By way of example, and not limitation, the squeezed light generated by a first portion of the N resonators 208-212 can be coherently summed by the MZM array 214 and output at a first port of the MZM array 214. Continuing the example, the squeezed light generated by a second portion of the N resonators 208-212 can be coherently summed by the MZM array 214 and output at a second output port of the array 214.

The output of the MZM array 214 (which may be output at any of a plurality of output ports of the array 214) is an optical signal having greater brightness than the outputs of the optomechanical resonators 208-212 individually, but a substantially same degree of squeezing as the outputs of the resonators 208-212. The squeezed output of the MZM array 214 can be taken as the output of the squeezed light generator 200. Thus, the squeezed light generator 200 is suitable for generating high-brightness squeezed light.

Figure 6:
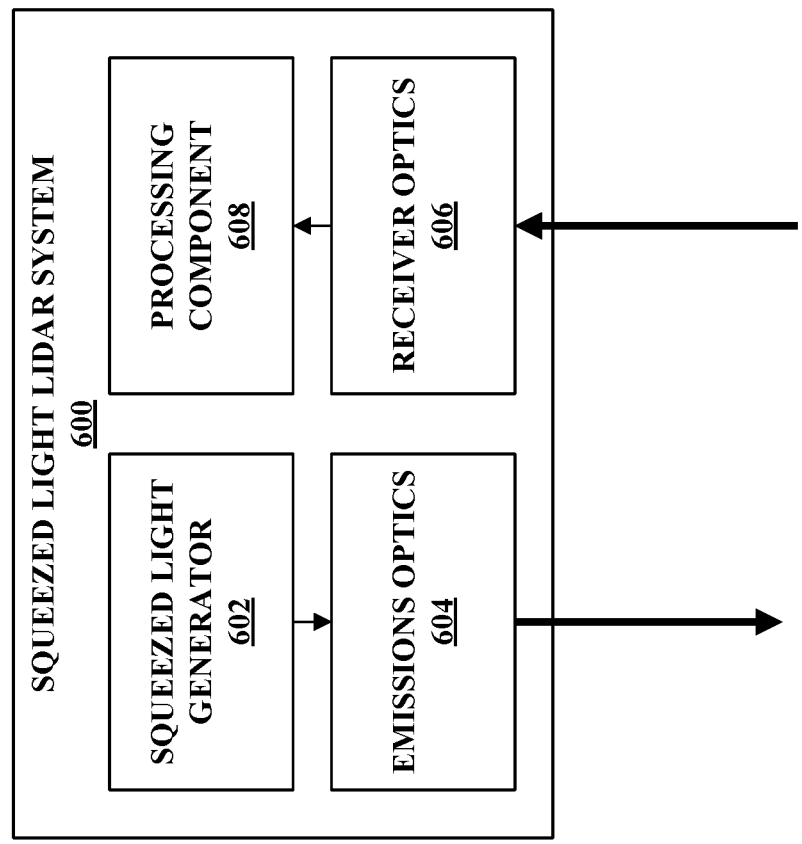
FIG. 6 is a functional block diagram of an exemplary squeezed light lidar system.

The squeezed light generators 100, 200 described herein are suitable for use in various quantum sensing and quantum computing applications. In a non-limiting example, squeezed light generators described herein can be used in a lidar system that has improved measurement accuracy as compared to a lidar system employing conventional unsqueezed light. Referring now to FIG. 6, an exemplary squeezed light lidar system 600 is shown, wherein the lidar system 600 is configured to emit squeezed light into its operational environment. By virtue of the lidar system 600 emitting squeezed light, one of an amplitude or a phase of a lidar return can be determined accurately with finer resolution than for an otherwise equal unsqueezed lidar system. In turn, the finer resolution of the amplitude or phase of the lidar return can allow the lidar system 600 to generate lidar measurements at longer range and/or with greater precision.

The lidar system 600 comprises a squeezed light generator 602, emissions optics 604, receiver optics 606, and a processing component 608. The squeezed light generator 602 is configured to output squeezed light, and can be configured in similar fashion to the squeezed light generators 100, 200 described above. The emissions optics 604 receive squeezed light from the squeezed light generator 602. The emissions optics 604 are configured to emit the squeezed light into the operational environment of the squeezed light lidar system 600 (e.g., a region that is desirably measured by way of the squeezed light lidar system 600). For example, the emissions optics 604 can be or include a system of waveguides, optical fibers, lenses, or the like, that are collectively configured to receive a squeezed optical signal from the squeezed light generator 602 and to output a beam of the squeezed light into the operational environment.

The receiver optics 606 are configured to receive a reflection of the emitted squeezed light from the operational environment. In some embodiments, the receiver optics 606 can further be configured to output optical data indicative of one or more characteristics of the reflected light. By way of example, the receiver optics 606 can be configured to output optical data that is indicative of one or both of an amplitude and a phase of the reflected light. The receiver optics 606 can include a system of lenses or other optical components that are configured to collect reflected light from the operational environment of the system 600 and to focus such light for receipt at an optical detector. The optical detector can be configured to output a signal that is indicative of at least one of an amplitude or a phase of the received light. In embodiments wherein the receiver optics 606 output optical data indicative of amplitude and/or phase of the received light, the processing component 608 is configured to compute a distance to the object from which the received light was reflected based upon the optical data. In other embodiments, the processing component 608 can be configured to generate the optical data based upon a signal output by an optical detector, and then to compute the distance based upon the generated optical data. The processing component 608 can therefore generate, based upon data indicative of reflections of light from the operational environment of the lidar system 600, a lidar point cloud that is representative of positions of objects in the operational environment.

Figure 7:
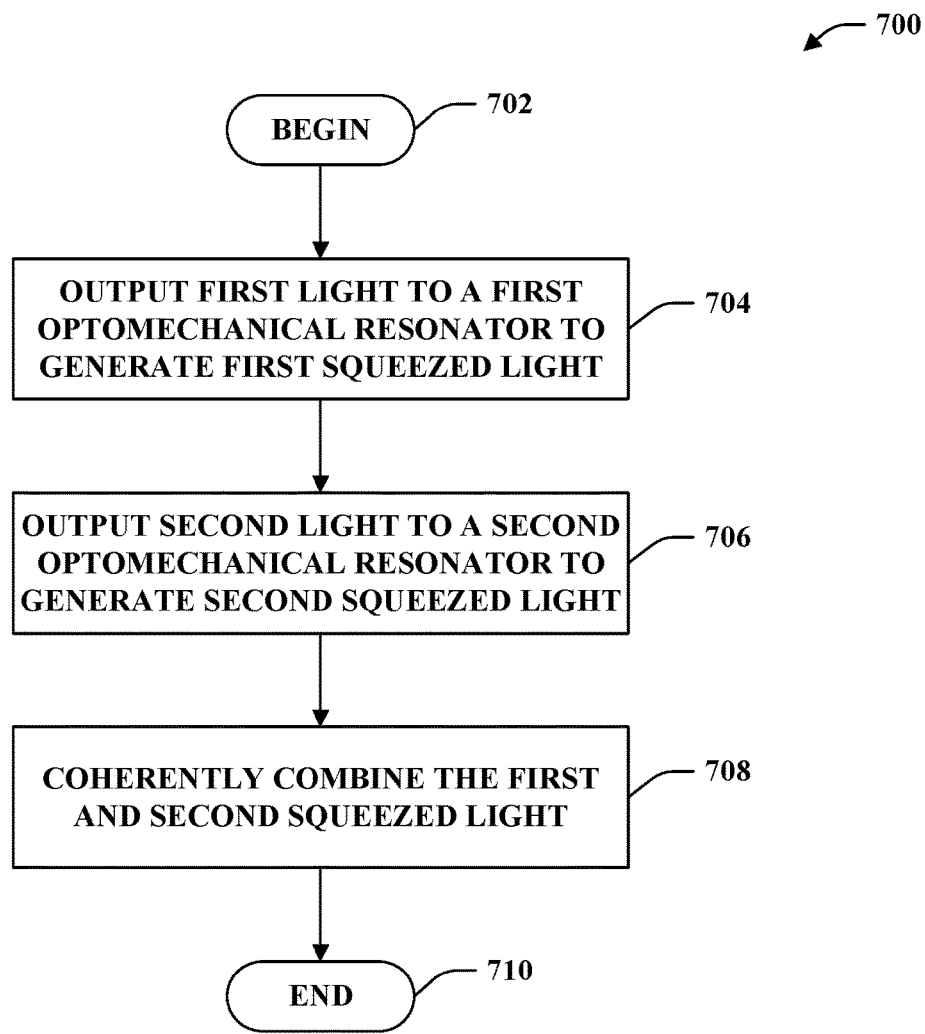
FIG. 7 is a flow diagram that illustrates an exemplary methodology for generating high-brightness squeezed light.

FIG. 7 illustrates an exemplary methodology relating to generating high-brightness squeezed light. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be encompassed in whole or in part by computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 that facilitates generating high-brightness squeezed light is illustrated. The methodology 700 begins at 702, and at 704, first light is output to a first optomechanical resonator to generate first squeezed light. As described above with respect to the optomechanical resonators 208-212, the first optomechanical resonator can be configured to output the squeezed light based upon an interaction between optical and mechanical resonances within the optomechanical resonator that causes light output from the first optomechanical resonator to be squeezed. At 706, second light is output to a second optomechanical resonator to generate second squeezed light. At 708, the first squeezed light and the second squeezed light are coherently combined to generate third squeezed light. The third squeezed light has a brightness that is greater than a brightness of either the first squeezed light or the second squeezed light. Further, by virtue of the coherent combination of the first and second squeezed light, the third squeezed light has a degree of squeezing that is substantially similar to one or both of the first squeezed light or the second squeezed light. The methodology 700 then ends 710.

Figure 8:
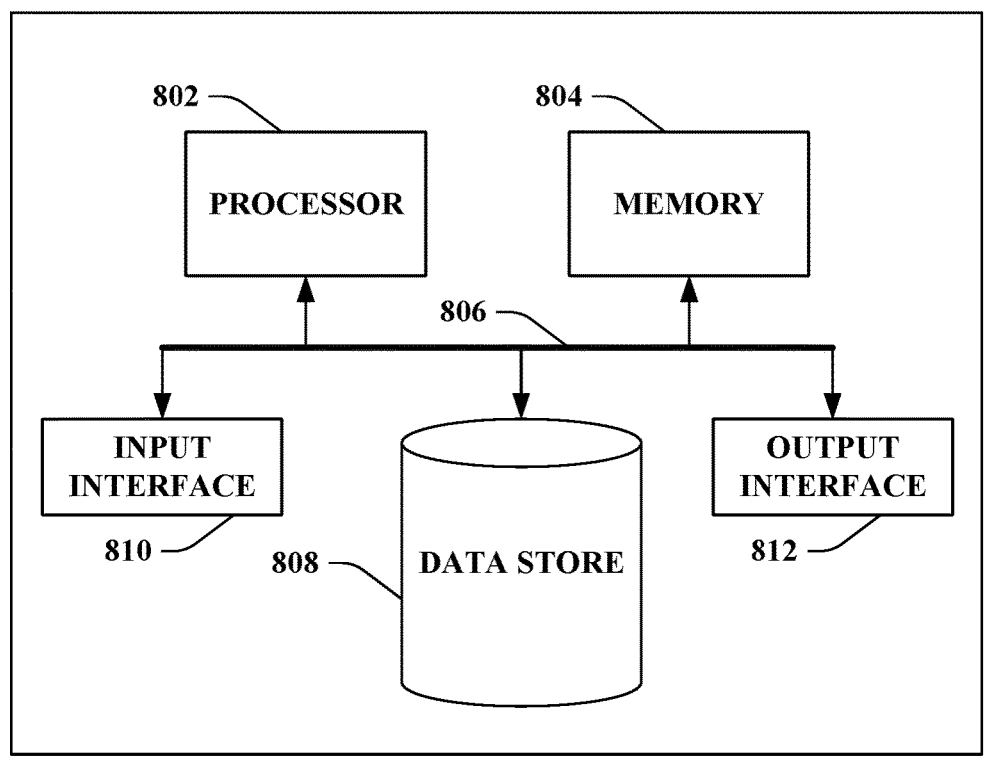
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in the lidar system 600 to process data pertaining to optical returns in order to generate lidar data (e.g., as described with respect to the processing component 608). By way of another example, the computing device 800 can be used in a squeezed light generator to control functionality of one or more components of the generator (e.g., as described with respect to the controller 204 of the squeezed light generator 200). The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store amplitudes and phases of optical returns of a lidar system, lidar data (e.g., a lidar point cloud), or the like.

The computing device 800 additionally includes a data store 808 that is accessible by the processor 802 by way of the system bus 806. The data store 808 may include executable instructions, optical or lidar data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a first optomechanical resonator that is configured to receive first light and to output first squeezed light;
   a second optomechanical resonator that is configured to receive second light and to output second squeezed light; and
   a photonic summing device configured to receive the first squeezed light and the second squeezed light and to output third squeezed light, the third squeezed light having a greater power than the first squeezed light or the second squeezed light.

2. The system of claim 1, the first squeezed light having a first degree of squeezing, the second squeezed light having a second degree of squeezing, the third squeezed light having a third degree of squeezing that is approximately the same as at least one of the first degree of squeezing or the second degree of squeezing.

3. The system of claim 2, wherein the third degree of squeezing is within 10% of at least one of the first degree of squeezing or the second degree of squeezing.

4. The system of claim 1, wherein the first optomechanical resonator is configured to vibrate responsive to receipt of the first light, wherein vibration of the first optomechanical resonator is squeezed.

5. The system of claim 4, wherein the vibration of the first optomechanical resonator causes an optical resonance frequency of the first optomechanical resonator to change.

6. The system of claim 1, wherein the first optomechanical resonator comprises a film having a plurality of apertures formed therein.

7. The system of claim 1, wherein the first light comprises fourth light having a first frequency and fifth light having a second frequency.

8. The system of claim 7, wherein the first optomechanical resonator outputs the first squeezed light such that the first squeezed light has a third frequency that is between the first frequency and the second frequency.

9. The system of claim 1, wherein the photonic summing device comprises a programmable nanophotonic processor.

10. The system of claim 1, wherein the photonic summing device performs coherent summing of the first squeezed light and the second squeezed light to output the third squeezed light.

11. The system of claim 1, wherein the system is a lidar system, the system further comprising:
- an optical emission element, the optical emission element configured to receive the third squeezed light and to emit the third squeezed light into an operational environment of the lidar system; and
- an optical receiver configured to receive a reflection of the third squeezed light from an object in the operational environment, the reflection of the third squeezed light being indicative of a distance to the object.

12. The system of claim 1, wherein the photonic summing device comprises a Mach-Zehnder modulator (MZM), wherein the MZM receives the first squeezed light and the second squeezed light and outputs the third squeezed light based upon a phase shift imparted between arms of the MZM.

13. The system of claim 12, wherein the first optomechanical resonator, the second optomechanical resonator, and the MZM are integrated in a same photonic integrated circuit disposed on a common substrate.

14. A system, comprising:
- a first light-squeezing device that is configured to receive first light and to output first squeezed light;
- a second light-squeezing device that is configured to receive second light and to output second squeezed light; and
- a Mach-Zehnder modulator configured to coherently add the first squeezed light and the second squeezed light to generate third squeezed light, wherein the first light-squeezing device, the second light-squeezing device, and the Mach-Zehnder modulator are formed as components of a photonic integrated circuit (PIC).

15. The system of claim 14, wherein the first light-squeezing device is a first optomechanical resonator and the second light-squeezing device is a second optomechanical resonator.

16. The system of claim 15, wherein the first optomechanical resonator and the second optomechanical resonator are positioned in sufficiently close proximity that an evanescent field generated by light traveling in the first optomechanical resonator couples with light traveling in the second optomechanical resonator.

17. The system of claim 15, wherein the first optomechanical resonator and the second optomechanical resonator are coupled by way of a coupling member, wherein the coupling member couples mechanical vibrations in the first optomechanical resonator with mechanical vibrations in the second optomechanical resonator.

18. The system of claim 14, wherein the third squeezed light has a brightness greater than a brightness of the first squeezed light and a brightness of the second squeezed light, and wherein further a degree of squeezing of the third squeezed light is substantially the same as at least one of a degree of squeezing of the first squeezed light or the second squeezed light.

19. The system of claim 14, further comprising an optical driver that is coupled to the first light-squeezing device and the second light-squeezing device such that the optical driver outputs the first light and the second light to the first light-squeezing device and the second light-squeezing device, respectively, the optical driver configured to output two-tone light.

20. A method, comprising:
- outputting first light to a first optomechanical resonator, wherein the first optomechanical resonator is configured to output first squeezed light responsive to receiving the first light;
- outputting second light to a second optomechanical resonator, wherein the second optomechanical resonator is configured to output second squeezed light responsive to receiving the second light; and
- combining the first squeezed light and the second squeezed light by way of a photonic array to generate third squeezed light that has a brightness greater than the first squeezed light and the second squeezed light, the photonic array configured to perform coherent summing of the first squeezed light and the second squeezed light.

* * * * *